US012490935B2

(12) United States Patent
Rehman et al.

(10) Patent No.: US 12,490,935 B2
(45) Date of Patent: Dec. 9, 2025

(54) ORAL MEASUREMENT DEVICES AND METHODS

(71) Applicant: The Johns Hopkins University, Baltimore, MD (US)

(72) Inventors: Mohamed Rehman, Baltimore, MD (US); Luis Ahumada, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 505 days.

(21) Appl. No.: 17/775,007

(22) PCT Filed: Nov. 9, 2020

(86) PCT No.: PCT/US2020/059668
§ 371 (c)(1),
(2) Date: May 6, 2022

(87) PCT Pub. No.: WO2021/092556
PCT Pub. Date: May 14, 2021

(65) Prior Publication Data
US 2022/0378369 A1    Dec. 1, 2022

Related U.S. Application Data

(60) Provisional application No. 62/933,273, filed on Nov. 8, 2019.

(51) Int. Cl.
*A61B 5/00* (2006.01)
*A61B 5/01* (2006.01)
(Continued)

(52) U.S. Cl.
CPC ............... *A61B 5/682* (2013.01); *A61B 5/01* (2013.01); *A61B 5/0205* (2013.01); *A61B 5/1114* (2013.01); *A61B 5/14507* (2013.01)

(58) Field of Classification Search
CPC ..... A61B 5/01; A61B 5/0205; A61B 5/02416; A61B 5/1112; A61B 5/1114;
(Continued)

(56) References Cited

U.S. PATENT DOCUMENTS 9,160,203 B2    10/2015    Fiorello et al.
11,064,913 B2 *  7/2021    Gonzales ............. A61B 5/1122
(Continued)

FOREIGN PATENT DOCUMENTS

CA    2820641           5/2012
GB    2577939 A   *   4/2020   .......... A61B 5/0002
(Continued)

OTHER PUBLICATIONS

Adrega et al., "Thin-film silicon MEMS DNA sensors," J. Non-Crystalline Solids, 2006, 352(9-20):1999-2003.
(Continued)

*Primary Examiner* — Allen Porter
*Assistant Examiner* — Shreya Anjaria
(74) *Attorney, Agent, or Firm* — Fish & Richardson P.C.

(57) ABSTRACT

Measurement devices include a housing featuring a channel, where the housing is dimensioned to be worn in an oral cavity of a user and the channel is positioned such that at least some of the user's teeth are positioned in the channel when the housing is worn, a first sensor positioned within or on a surface of the housing, where the first sensor is configured to generate a first measurement signal that includes information about a position of the measurement device, and a second sensor positioned within or on a surface of the housing, where the second sensor is configured to generate a second measurement signal that includes information about at least one of a biochemical and an electrical property of the user's oral cavity.

23 Claims, 2 Drawing Sheets

(51) Int. Cl.
*A61B 5/0205* (2006.01)
*A61B 5/11* (2006.01)
*A61B 5/145* (2006.01)

(58) Field of Classification Search
CPC .............. A61B 5/1118; A61B 5/14507; A61B 5/14532; A61B 5/1455; A61B 5/332; A61B 5/6803; A61B 5/682
See application file for complete search history.

(56) References Cited

U.S. PATENT DOCUMENTS

| | | | |
|---|---|---|---|
| 2009/0048647 A1* | 2/2009 | Tingey | A61N 1/36031 607/62 |
| 2013/0211270 A1* | 8/2013 | St. Laurent | A61B 5/682 600/595 |
| 2015/0119759 A1 | 4/2015 | Gonzales et al. | |
| 2015/0238142 A1 | 8/2015 | Djordjevski | |
| 2016/0338626 A1* | 11/2016 | Wang | A61B 5/6802 |
| 2017/0020434 A1* | 1/2017 | Walker | A61B 5/4064 |
| 2017/0071526 A1 | 3/2017 | Lyren | |
| 2017/0224252 A1 | 8/2017 | Salzar et al. | |
| 2017/0312614 A1* | 11/2017 | Tran | G06F 3/00 |
| 2018/0310881 A1* | 11/2018 | Yoon | A61B 5/02416 |
| 2019/0125261 A1 | 5/2019 | Lathrop et al. | |
| 2022/0257968 A1* | 8/2022 | Wu | A46B 15/00 |
| 2022/0378369 A1 | 12/2022 | Rehman et al. | |

FOREIGN PATENT DOCUMENTS

| | | |
|---|---|---|
| WO | WO 2010044879 | 4/2010 |
| WO | WO 2019108946 | 6/2019 |

OTHER PUBLICATIONS

Ali et al., "Piezoelectric MEMS based acoustic sensors: A review," Sensors and Actuators A: Physical, 2020, 301:111756.

Arefin et al., "A MEMS capacitive pH sensor for high acidic and basic solutions," Sensors, 2014 IEEE, pp. 1792-1794.

Bingger et al., "In vivo monitoring of blood oxygenation using an implantable MEMS-based sensor," 2010 IEEE 23rd International Conference on Micro Electro Mechanical Systems (MEMS), 2010, pp. 1031-1034.

Bridgman et al., "Mechanical safety of embedded electronics for in-body wearables: A smart mouthguard study," Annals of biomedical engineering, 2019, 47(8):1725-1737.

Chen et al., "A wireless bio-MEMS sensor for C-reactive protein detection based on nanomechanics," IEEE Trans Biomed Eng., 2009, 56(2):462-70.

Davies et al., "Unobtrusive Bioanalytics for Impact-Related Sport Activities," in International Conference on Applied Human Factors and Ergonomics, Jul. 2018, 285-293.

Hegde et al., "Piezoelectric acoustic MEMS sensor based electrical machines condition monitoring-diaphragm design analysis," 2013 International conference on Circuits, Controls and Communications (CCUBE), 2013, pp. 1-7.

Huang et al., "A MEMS affinity glucose sensor using a biocompatible glucose-responsive polymer," Sens Actuators B Chem, 2009, 140(2):603-609.

International Preliminary report on Patentability in Application No. PCT/US2020/059668, mailed May 10, 2022, 7 pages.

International Search Report and Written Opinion in International Application No. PCT/US2020/059668, mailed Feb. 25, 2021, 9 pages.

Isoda et al., "Fluidic MEMS based Biosensor for the Detection of Nucleic acids by using Schizophyllan," IEEJ Trans. On Sensors and Micromachines, 2005, 125(2):81-88.

Karthikeyan et al., "Fluorometric Sensor for Mercury Ion Detection in a Fluidic MEMS Device," IEEE Sensors Journal, 2018, 18(13):5225-5231.

Kim et al., "Miniature electrocardiogramansor using a flexible printed circuit and MEMS technology," 2008 IEEE International Conference on Multisensor Fusion and Integration for Intelligent Systems, 2008, pp. 545-550.

Liu et al., "A novel potential modulated amino acid sensing chip modified by MXene for total internal reflection imaging ellipsometry biosensor," 2018 IEEE Micro Electro Mechanical Systems (MEMS), 2018, pp. 348-351.

Packard et al., "Microfluidic-Based Amplification-Free Bacterial DNA Detection by Dielectrophoretic Concentration and Fluorescent Resonance Energy Transfer Assisted in Situ Hybridization (FRET-ISH)," Biosensors, 2012, 2(4):405-416.

Wang, "Micro and Nanotechnologies Enhanced Biomolecular Sensing," Biosensors, 2013, 3(3):283-285.

Wu et al., "A Microfluidic Ion Sensor Array," Small, 2020, 16(6):1906436.

Zhang et al., "Design and Fabrication of a Solid-State pH Sensor Module," The Third International Conference on Advances in Sensors, Actuators, Metering and Sending, 2018, pp. 101-102.

\* cited by examiner

ORAL MEASUREMENT DEVICES AND METHODS

CROSS-REFERENCE TO RELATED APPLICATIONS

This application is a National Stage application under 35 U.S.C. § 371 of International Application No. PCT/US2020/059668 having an International Filing Date of Nov. 9, 2020, which claims priority to U.S. Provisional Patent Application No. 62/933,273, filed on Nov. 8, 2019, the entire contents of which are incorporated by reference herein.

TECHNICAL FIELD

This disclosure relates to the measurement, analysis, and transmission of physiological and position information.

BACKGROUND

Existing measurement systems that report physiological data may interrogate blood, for example, either invasively or non-invasively, to measure parameter values that are related to a variety of physical attributes and conditions. Direct contact with and measurement of blood attributes can be complex and inconvenient for a user, and typically requires a controlled, sanitary environment. Indirect measurement of blood attributes typically relies on maintaining a careful placement of a monitoring device, and may therefore be limited in effectiveness depending upon the nature of a user's activity.

SUMMARY

The oral cavity provides direct access to saliva, a body fluid that is a potentially rich source of physiological data related to a user's homeostatic condition. Existing measurement systems, however, are typically poorly suited for measuring physiological parameters within a user's oral cavity. The present disclosure features devices and methods for direct measurement of physiological parameters from saliva, optionally in real-time or near real-time. Parameter values can be transmitted to a remote database and/or computing system for processing and evaluation. Data, messages, and alerts or warnings based on the transmitted parameter values can be transmitted to a variety of receivers for evaluation of the user's physiology and condition.

The devices and methods can also include a variety of sensors for collecting position-related information associated with the user. Position-related information includes, but is not limited to, changes in the user's position and orientation. Because this information can also be collected in real-time or near real-time from sensors located in the user's oral cavity, the information provides a rich set of data that can be used to detect traumatic physical incidents involving the user's head, and also to pro-actively assess the suitability of the user's participation in activities in which continued physical impact or trauma may occur. In particular, information obtained in this manner can be used to assess whether the user has suffered or is at risk of suffering a concussion, and whether the user's continued participation in activities in which concussions and other head injurious events are likely to occur is medically advisable.

In an aspect, the disclosure features measurement devices that include a housing featuring a channel, where the housing is dimensioned to be worn in an oral cavity of a user and the channel is positioned such that at least some of the user's teeth or gums are positioned in the channel when the housing is worn, a first sensor positioned within or on a surface of the housing, where the first sensor is configured to generate a first measurement signal comprising information about a position of the measurement device, and a second sensor positioned within or on a surface of the housing, where the second sensor is configured to generate a second measurement signal comprising information about at least one of a biochemical and an electrical property of the user's oral cavity.

Embodiments of the devices can include any one or more of the following features.

The first measurement signal can include information about a spatial coordinate position of the measurement device. The first measurement signal can include information about a change in a spatial coordinate position of the measurement device. The first measurement signal can include information about a change in a rotational orientation of the measurement device. The first measurement signal can include information about a linear acceleration of the measurement device. The first measurement signal can include information about a rotational acceleration of the measurement device.

The second measurement signal can include information about a hydrogen ion concentration in saliva in the user's oral cavity. The second measurement signal can include information about a glucose concentration in saliva in the user's oral cavity. The second measurement signal can include information about a concentration of a nucleic acid species in the user's oral cavity. The second measurement signal can include information about a concentration of an amino acid species in the user's oral cavity. The second measurement signal can include information about blood oxygen saturation in the user's oral cavity. The information about blood oxygen saturation can correspond to arterial oxygen saturation and/or oxygen saturation of brain tissue. The second measurement signal can include information about a concentration of ions in saliva in the user's oral cavity. The information about the concentration of ions can correspond to concentration information for at least one of sodium ions and potassium ions in the saliva in the user's oral cavity. The second measurement signal can include electrical impulse information in the user's oral cavity. The electrical impulse information can correspond to the user's heart muscle contractions. The second measurement signal can include acoustic information in the user's oral cavity. The acoustic information can correspond to blood flow in the user's oral cavity.

The devices can include an interface electrically connected to the first and second sensors, and configured to further connect to a transmitter. The devices can include a transmitter positioned within or on a surface of the housing and configured to transmit information derived from the first and second measurement signals.

The housing can include a first arched portion featuring the channel, and a second portion extending outward from the first portion. The first and second sensors can be positioned on or within the first portion, and the transmitter can be positioned on or within the second portion.

The devices can include third sensor positioned within or on a surface of the housing, where the third sensor is configured to generate a third measurement signal that includes information about a temperature within the user's oral cavity.

The second sensor can be positioned on or within a wall formed by a portion of the housing, where the wall forms a portion of the housing that is positioned adjacent to an inner surface of the at least some of the user's teeth when the housing is worn. The second sensor can be positioned on or within a wall formed by a portion of the housing, where the wall forms a portion of the housing that is positioned adjacent to an outer surface of the at least some of the user's teeth when the housing is worn.

The devices can include an electronic processor positioned on or within the housing and electrically connected to the first and second sensors. The electronic processor can be configured to receive the first and second measurement signals and generate corresponding first and second data signals, where the first data signal includes information about the position of the device and the second data signal includes information about the at least one of the biochemical and the electrical property of the user's oral cavity, and transmit the first and second data signals using a transmitter connected to the electronic processor. The electronic processor can be configured to receive repeated first and second measurement signals from the first and second sensors and to generate repeated first and second data signals, and the electronic processor can be configured to generate the first data signal at a first frequency and to generate the second data signal at a second frequency. The first frequency can be higher than the second frequency.

The at least one of a biochemical and an electrical property of the user's oral cavity can be a first property, and the device can include a fourth sensor positioned within or on a surface of the housing, where the fourth sensor is configured to generate a fourth measurement signal that includes information about a second property of the user's oral cavity, and where the second property includes at least one of a biochemical and an electrical property of the user's oral cavity. The electronic processor can be configured to receive repeated fourth measurement signals from the fourth sensor and to generate repeated corresponding fourth data signals, the fourth data signals including information about the second property of the user's oral cavity, and the electronic processor can be configured to generate the fourth data signal at a fourth frequency.

The second and fourth frequencies can be the same or different. The second sensor can be a pH sensor and/or a glucose sensor and/or a pulse oximetry sensor and/or a blood oxygen sensor and/or an EKG sensor and/or an acoustic sensor.

Embodiments of the devices can also include any of the other features described herein, and can include combinations of any features, including combinations of any features described in connection with different embodiments, except as expressly stated otherwise.

In another aspect, the disclosure features methods that include: measuring, with a measurement device positioned in an oral cavity of a subject, information about a position of the subject's head; measuring, with the measurement device, information about at least one of a biochemical property and an electrical property of the subject's oral cavity; and transmitting the information about the position of the subject's head and about the at least one of the biochemical property and the electrical property to a remote processing system.

Embodiments of the methods can include any one or more of the following features.

The information about the position of the subject's head can include information about a spatial coordinate position of the measurement device and/or information about a change in a rotational orientation of the measurement device and/or information about a linear acceleration of the measurement device and/or information about a rotational acceleration of the measurement device.

The information about the at least one of the biochemical property and the electrical property of the subject's oral cavity can include information about a hydrogen ion concentration in saliva in the user's oral cavity and/or information about a glucose concentration in saliva in the user's oral cavity and/or information about a concentration of a nucleic acid species in the user's oral cavity and/or information about a concentration of an amino acid species in the user's oral cavity and/or information about blood oxygen saturation in the user's oral cavity (e.g., where the information about blood oxygen saturation corresponds to arterial oxygen saturation or oxygen saturation of brain tissue) and/or information about a concentration of ions in saliva in the user's oral cavity (e.g., concentration information for at least one of sodium ions and potassium ions in the saliva in the user's oral cavity) and/or electrical impulse information in the user's oral cavity (e.g., corresponding to the user's heart muscle contractions) and/or acoustic information in the user's oral cavity (e.g., corresponding to blood flow in the user's oral cavity). The methods can include measuring, with the measurement device, information about a temperature within the user's oral cavity.

The methods can include repeating the measurement of information about the position of the subject's head, repeating the measurement of information about the at least one of the biochemical property and the electrical property of the subject's oral cavity, periodically transmitting a first data signal encoding the measured information about the position of the subject's head at a first frequency, and periodically transmitting a second data signal encoding the measured information about the at least one of the biochemical property and the electrical property of the subject's oral cavity at a second frequency, where the first frequency is higher than the second frequency.

The at least one of the biochemical property and the electrical property of the subject's oral cavity can be a first property, and the methods can include measuring, with the measurement device, a second property, where the second property includes at least one of a biochemical property and an electrical property of the subject's oral cavity. The methods can include repeating the measurement of the second property, and periodically transmitting a third data signal encoding the measured information about the second property at a third frequency. The second and third frequencies can be the same or different.

Embodiments of the methods can also include any of the other features described herein, and can include combinations of any features, including combinations of any features described in connection with different embodiments, except as expressly stated otherwise.

In another aspect, the disclosure features measurement devices that include a housing featuring a channel, where the housing is dimensioned to be worn in an oral cavity of a user and the channel is positioned such that at least some of the user's teeth or gums are positioned in the channel when the housing is worn, first and second sensors each positioned within or on a surface of the housing, and each configured to measure a value associated with a position of the measurement device, a biochemical property of the user's oral cavity, and an electrical property of the user's oral cavity, at respective first and second frequencies, a power source connected to the first and second sensors, and an electronic processor connected to the first and second sensors and to the power source, where the electronic processor is configured so that during operation of the measurement device, the electronic processor regulates power delivery from the power source to the first and second sensors based on the first and second frequencies and an impact count associated with the user.

Embodiments of the devices can include any one or more of the following features.

The electronic processor can be configured to determine when an impact has occurred based on the values measured by the first and second sensors. The electronic processor can be configured to adjust the impact count after determining that an impact has occurred. The electronic processor can be configured to increase a rate of power delivery to at least one of the first and second sensors following an increase in the impact count. The electronic processor can be configured to adjust at least one of the first and second frequencies following the increase in the impact count. The electronic processor can be configured to increase at least one of the first and second frequencies following the increase in the impact count.

The devices can include a transmitter connected to the electronic processor and to the power source, where the electronic processor is configured to transmit the values measured by the first sensor at a third frequency to a receiver, and to transmit the values measured by the second sensor at a fourth frequency to the receiver.

The electronic processor can be configured to increase a rate of power delivery to the transmitter following the increase in the impact count. The electronic processor can be configured to increase at least one of the third and fourth frequencies following the increase in the impact count.

The values measured by the first sensor can include at least one of information about a spatial coordinate position of the measurement device and information about a change in a spatial coordinate position of the measurement device. The values measured by the first sensor can include at least one of information about a change in a rotational orientation of the measurement device, information about a linear acceleration of the measurement device, and information about a rotational acceleration of the measurement device.

The values measured by the first sensor can include information about at least one of a hydrogen ion concentration in saliva in the user's oral cavity, a glucose concentration in saliva in the user's oral cavity, a concentration of a nucleic acid species in the user's oral cavity, a concentration of an amino acid species in the user's oral cavity, a blood oxygen saturation in the user's oral cavity, and a concentration of ions in saliva in the user's oral cavity.

The values measured by the first sensor can include electrical impulse information in the user's oral cavity corresponding to the user's heart muscle contractions. The values measured by the first sensor can include acoustic information in the user's oral cavity corresponding to blood flow in the user's oral cavity.

The electronic processor can be configured to increase the rate of power delivery to the first sensor and decrease the rate of power delivery to the second sensor. The electronic processor can be configured to increase the first frequency and decrease the second frequency. The electronic processor can be configured to discontinue measurement of values by the second sensor.

The devices can include a third sensor positioned within or on the surface of the housing and connected to the electronic processor and to the power source, and configured to measure a value associated with a position of the measurement device, a biochemical property of the user's oral cavity, and an electrical property of the user's oral cavity, at a fifth frequency. The electronic processor can be configured to initiate power delivery to the third sensor to activate the third sensor and measure the values using the third sensor. The electronic processor can be configured to increase power delivery to the third sensor following the increase in the impact count. The electronic processor can be configured to increase the fifth frequency following the increase in the impact count.

The devices can include a transmitter connected to the electronic processor and to the power source, where the electronic processor is configured to transmit the values measured by the third sensor at a sixth frequency to a receiver. The electronic processor can be configured to increase the sixth frequency following the increase in the impact count.

Embodiments of the devices can also include any of the other features described herein, and can include combinations of any features, including combinations of any features described in connection with different embodiments, except as expressly stated otherwise.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

Figure 1:
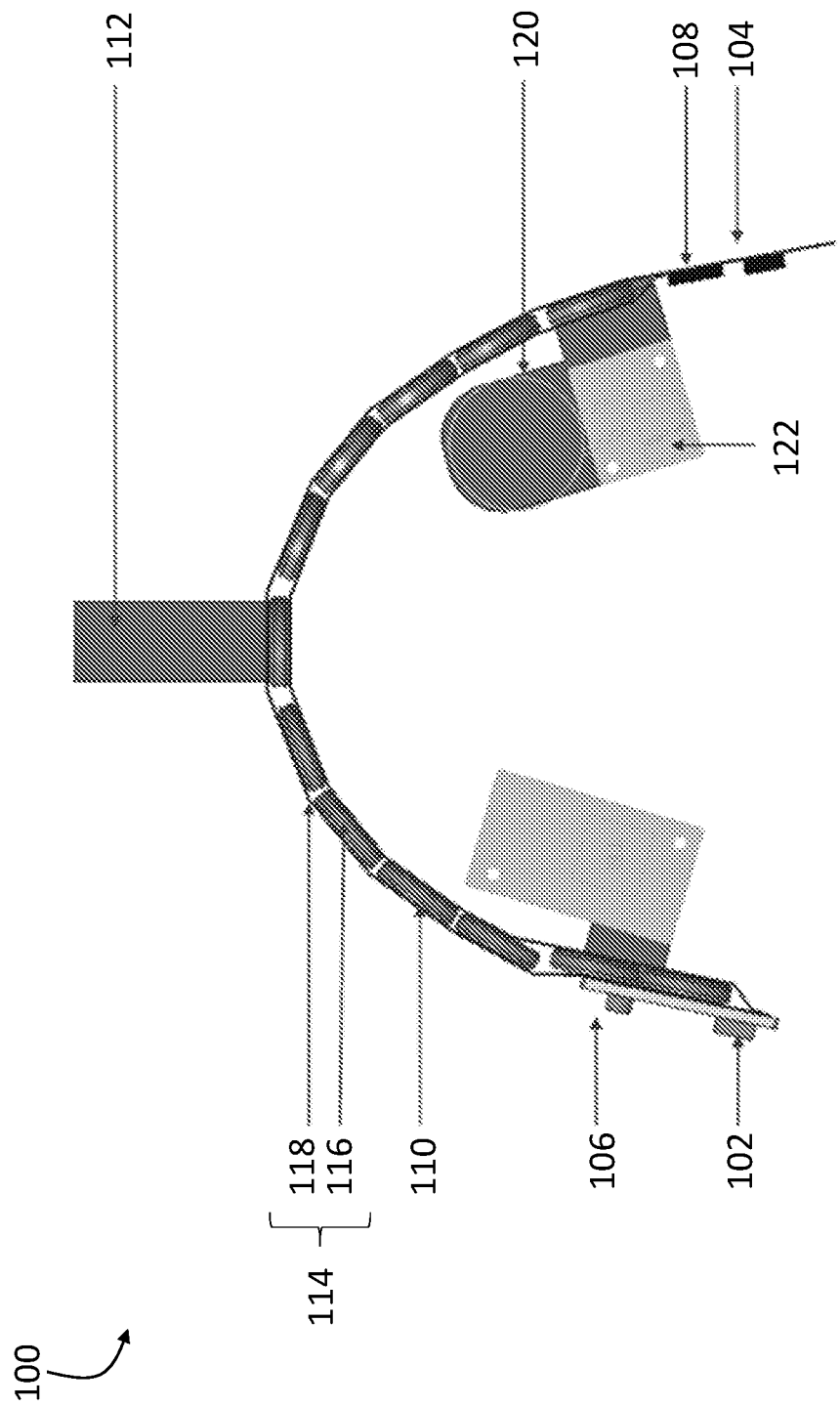
FIG. 1 is a schematic diagram of an example of an oral measurement device.

A variety of systems exist for measuring physiological parameters from body fluids. Perhaps most common among these are systems that invasively or non-invasively measure blood parameters, including pH, lactate concentration, blood oxygenation, and concentrations of various substances and metabolites. Direct measurement of blood parameters can be challenging in certain environments, however. For example, invasive blood measurements can be time-consuming and unpleasant for a subject, and blood samples are typically obtained under sanitary conditions. These types of measurements can be challenging to perform outside of a laboratory environment and when a subject is engaged in non-resting activity.

Non-invasive blood measurements are typically obtained by one or more monitoring devices that are worn by a subject. However, such monitoring devices can be inconveniently large and/or difficult to maintain in position on the subject. Further, they may compromise the subject's appearance in a manner that the subject deems unacceptable.

The oral cavity offers a direct "window" into a subject's body and access to body fluid (e.g., saliva) that can be directly measured within the oral cavity, with no piercing of skin tissue or wearing of external monitoring devices. The present disclosure features devices and methods that can be used to measure both physical information and physiological information within a user's oral cavity. Both types of information can optionally be measured in real-time or near real-time, and transmitted to a remote computing device or data storage facility. Information obtained in this manner can be used to inform a wide variety of decision-making processes, including in-the-moment decisions relating to the user's participation in certain physical activities, decisions during surgical operations, and evaluation of the future likelihood of certain types of injuries to which the user's historical exposure and physiological state may make him/her prone.

The devices described herein can be particularly useful for applications involving strenuous physical activity, such as participation in sporting events and battlefield engagements. Such activities have the potential to induce physical trauma of various types, and information obtained from dynamic oral cavity measurements is therefore highly useful both for the assessment of a user's current condition, and for making decisions regarding the likelihood that the user will develop symptoms or conditions based on his/her trauma history.

For many applications, the devices described herein can be implemented as a mouthguard that is worn by the user internal (or at least partially internal) to the user's oral cavity. Examples of mouthguard implementations of the devices are described below. However, it should be understood that more generally, the devices can be implemented in any form factor or configuration that is suitable to be worn in such a manner that the device can measure both physical parameters associated with the position and/or orientation of the user's head, and physiological parameters from within the user's oral cavity. It is not required that the housing or support structure for the devices be implemented as a mouthguard, and other types of housings and support structures are within the scope of this disclosure.

FIG. 1 is a schematic diagram showing an example of an oral measurement device 100. Device 100 in FIG. 1 is implemented as a mouthguard for use by athletes participating in sporting activities, and also for use by individuals involved in other resting or non-resting activities. As shown in FIG. 1, device 100 includes a first sensor 102, an optional second sensor 104, an optional third sensor 106, and an optional fourth sensor 108. In addition, device 100 includes a power source 110 and a signal transmitter 112. The foregoing components of device 100 are connected to a controller 114. Controller 114 generally includes one or more control boards with integrated logic components, and can perform any of the control functions described herein. In the example shown in FIG. 1, controller 114 is implemented with two control boards 116 and 118, although more generally, controller 114 can include any number of control boards. Device 100 can also optionally include a wireless charging assembly that includes a charging coil, an AC-DC rectifier, and a control board 122 that regulates various charging functions and is optionally connected to controller 114. Examples of suitable charging assemblies and their operation are described in U.S. Pat. No. 9,160,203, the entire contents of which are incorporated herein by reference.

Figure 2:
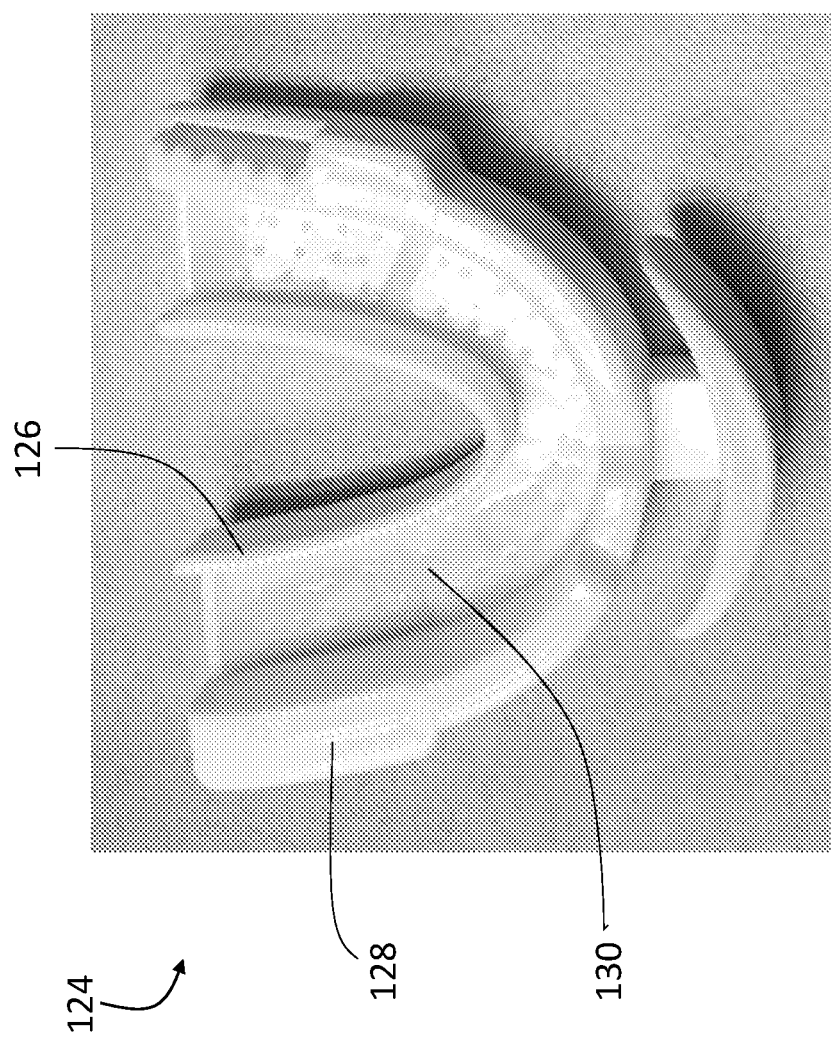
FIG. 2 is a schematic diagram showing an example of a housing of an oral measurement device.

The components of device 100 are typically positioned within or on a housing. For implementation as an oral measurement device, in some embodiments, the housing has the form factor of mouthguard. FIG. 2 shows a housing 124 in the shape of a mouthguard, with housing 124 featuring an inner wall 126, an outer wall 128, and a channel 130 between the inner and outer walls. Housing 124 is dimensioned to be worn in an oral cavity of a user of device 100, such that at least some of the user's teeth are positioned in channel 130 when housing 124 is worn.

In some embodiments, some or all of the components of device 100 are positioned within one of the inner and outer walls 126 and 128. In certain embodiments, some or all of the components of device 100 are positioned on one of the inner and outer walls 126 and 128. Depending upon the nature of the various components of device 100, certain advantages may arise from positioning certain components in a specific manner.

For example, where a particular sensor is configured to generate a measurement signal that includes information about a position of device 100, it can be advantageous to position the sensor within one of the inner and outer walls 126 and 128. The walls can protect the sensor from physical impact, from mechanical wear during use, and from the chemical environment of the user's oral cavity. Further, as the sensor does not require direct exposure to the user's oral cavity to generate measurement signals, the protective functions provided by positioning the sensor within one of the walls do not impede measurement of data by the sensor.

Where a particular sensor is configured to generate a measurement signal that includes information about a biochemical property and/or an electrical property of the user's oral cavity, it can be advantageous to position the sensor on a surface of one of the inner and outer walls 126 and 128. Positioning such a sensor in this manner provides direct exposure to the user's oral cavity (and to saliva and other substances within the oral cavity), and in some circumstances, increases the sensitivity of the sensor relative to a sensor that is not directly exposed to the user's oral cavity.

Further, in certain embodiments, positioning of electronic components such as controller 114 (and control boards 116 and 118), power source 110, portions of the wireless charging assembly, and/or electrical conductors connecting components of device 100, within one of the walls of housing 124 helps to prevent short circuits and exposure of the user's oral cavity to electrical currents.

During operation of device 100, sensor 102 (and optionally, one or more of sensors 104, 106 and 108 if present) can each be independently activated by controller 114, which transmits a control signal to each sensor to activate the sensor. Once activated, each sensor measures information about one or more properties of measurement device 100, one or more biochemical properties of the user's oral cavity, and/or one or more electrical properties of the user's oral cavity. Each sensor that measures a property generates a measurement signal comprising the measured information, which signal is transmitted to controller 114.

In some embodiments, one of the sensors of device 100 (e.g., any one of sensors 102, 104, 106, and/or 108) measures information about a position of measurement device 100. Many different types of position information can be measured, and a single sensor can measure one or more different types of position information. For purposes of illustration, sensor 102 is described as measuring position information, but it should be understood that any of the sensors of device 100 can measure position information, and device 100 can include one or more different sensors that measure the same or different position information.

In certain embodiments, sensor 102 measures spatial coordinate position information for device 100. For example, sensor 102 can communicate with a GPS satellite via signal transmitter 112 to obtain a spatial coordinate position of device 100. Alternatively, sensor 102 can communicate with other range finding and/or tracking systems and/or beacons to obtain information about the spatial coordinate position of device 100.

In some embodiments, sensor 102 measures changes in a spatial coordinate position of device 100. Sensor 102 can communicate with a GPS satellite or another range finding system, tracking system, or beacon(s), to obtain time-dependent position information for device 100, and then can determine the device's rate and/or direction of the change in the device's spatial coordinate position.

In certain embodiments, sensor 102 measures changes in a rotational orientation of device 100. For example, sensor 102 can be a gyro sensor that measures an angular velocity of measurement device 100 and generates a measurement signal that includes this information. Alternatively, or in addition, sensor 102 (e.g., implemented as a gyro sensor) can measure a rotational acceleration of device 100, and generate a corresponding measurement signal that includes this information. A variety of different sensors can be used to make such measurements. One such example is the CRG20 MEMS Gyro, available from Silicon Sensing (Devon, UK).

In some embodiments, sensor 102 measures a linear acceleration of device 100. For example, sensor 102 can be implemented as an accelerometer that generates a measurement signal that includes information about acceleration of device 100 along a linear coordinate direction. Alternatively, sensor 102 can be implemented as a position sensor that makes multiple measurements of a spatial coordinate position of device 100, and controller 114 can determine the linear acceleration of device 100 from changes in the device's position along a particular coordinate direction. A variety of different sensors can be used to make such measurements. One such example is the Gemini® MEMS Accelerometer, available from Silicon Sensing (Devon, UK).

In certain embodiments, sensor 102 measures any of the different types of spatial information described above along a single coordinate direction or about a single rotational axis. To measure any of the above types of information along multiple (e.g., orthogonal) coordinate directions or about multiple (e.g., orthogonal) rotational axes, device 100 can include multiple sensors, each dedicated to single-coordinate or single-axis measurements. Alternatively, device 100 can also include one or more sensors that measure position-related information along multiple (e.g., orthogonal) coordinate directions and/or about multiple (e.g., orthogonal) rotational axes simultaneously. Thus, for example, device 100 can include a single sensor 102 that measures changes in spatial coordinate position or linear acceleration along multiple (e.g., 2 or 3) linear coordinate directions. Device 100 can also include a single sensor 102 that measures changes in rotational orientation or rotational acceleration about multiple (e.g., 2 or 3) rotational axes.

In some embodiments, sensor 102 measures more than one different type of position information, along one or more different (e.g., orthogonal) coordinate directions, and/or about one or more different rotational axes. In general, sensor 102 can measure any combination of 2 or more (e.g., 3 or more, 4 or more, 5 or more, 6 or more, 8 or more, 10 or more) different types of position information for device 100. As an example, sensor 102 can be implemented as a multi-axis spatial sensor that measures position information and/or change-in-position information for device 100 along three orthogonal coordinate directions, linear acceleration information for device 100 along the three orthogonal coordinate directions, and angular velocity information for device 100 about three orthogonal rotational axes.

In some embodiments, one of the sensors of device 100 (e.g., any one of sensors 102, 104, 106, and/or 108) measures information about a biochemical or electrical property of the user's oral cavity. Many different types of such information can be measured, and a single sensor can measure one or more different types of information. For purposes of illustration, sensor 102 is described as measuring these types of information, but it should be understood that any of the sensors of device 100 can measure such information, and device 100 can include one or more different sensors that measure this type of information.

In certain embodiments, sensor 102 measures information about a hydrogen ion concentration in saliva in the user's oral cavity. For example, sensor 102 can be implemented as a pH sensor that measures pH directly. Controller 114 can convert the pH measurement into a hydrogen ion concentration in the user's saliva. Alternatively, sensor 102 can be implemented as a sensor that directly measures a hydrogen ion concentration the user's saliva. A variety of different types of sensors can be used for this purpose. Examples of suitable pH sensors for use in device 100 are described in Arefin et al., "A MEMS capacitive pH sensor for high acidic and basic solutions," SENSORS, 2014 IEEE, Valencia, 2014, pp. 1792-1794, doi: 10.1109/ICSENS.2014.6985373, and in Zhang et al., "Design and Fabrication of a Solid-State pH Sensor Module," ALLSENSORS 2018: The Third International Conference on Advances in Sensors, Actuators, Metering and Sensing, 2018, pp. 101-102, ISBN: 978-1-61208-621-7, available from www.thinkmind.org/articles as allsensors_2018_9_10_70079.pdf, the entire contents of each of which are incorporated by reference herein.

In some embodiments, sensor 102 measures information about a glucose concentration in the user's saliva. A variety of different glucose sensors can be used in device 100. An example of a suitable sensor is described in Huang et al., "A MEMS affinity glucose sensor using a biocompatible glucose-responsive polymer," Sens Actuators B Chem. 140(2): 603-609 (2009), the entire contents of which are incorporated herein by reference.

In certain embodiments, sensor 102 measures information about identities and/or concentrations of one or more nucleic acid species in the user's saliva. For example, in some embodiments, sensor 102 includes one or more probes that bind specific nucleic acid species, generating a signal (e.g., an electrical signal, or light emission) when binding occurs. Sensor 102 includes a detector that measures the electrical signal or light emission and determines, based on the measured information, identities and/or concentrations of one or more nucleic acid species.

A variety of different sensors can be used for detection of nucleic acid species in device 100. Examples of such sensors are described in Adrega et al., "Thin-film silicon MEMS DNA sensors," J. Non-Crystalline Solids 352(9-20): 1999-2003 (2006), Isoda et al. "Fluidic MEMS based Biosensor for the Detection of Nucleic acids by using Schizophyllan," IEEJ Trans. On Sensors and Micromachines 125(2): 81-88 (2005), Wang, "Micro and Nanotechnologies Enhanced Biomolecular Sensing," Biosensors 2013, 3(3), 283-285, and Packard et al., "Microfluidic-Based Amplification-Free Bacterial DNA Detection by Dielectrophoretic Concentration and Fluorescent Resonance Energy Transfer Assisted in Situ Hybridization (FRET-ISH)," Biosensors 2012, 2(4), 405-416, the entire contents of each of which are incorporated by reference herein.

In some embodiments, sensor 102 measures information about identities and/or concentrations of one or more amino acid species in the user's saliva. For example, in some embodiments, sensor 102 includes one or more probes that bind specific amino acid species, generating a signal (e.g., an electrical signal, or light emission) when binding occurs. Sensor 102 includes a detector that measures the electrical signal or light emission and determines, based on the measured information, identities and/or concentrations of one or more amino acid species. In general, a variety of different sensors can be used to measure amino acid species in device 100. Examples of such sensors are described in Liu et al., "A novel potential modulated amino acid sensing chip modified by MXene for total internal reflection imaging ellipsometry biosensor," 2018 IEEE Micro Electro Mechanical Systems (MEMS), Belfast, 2018, pp. 348-351, doi: 10.1109/MEMSYS.2018.8346558, and Chen et al., "A wireless bio-MEMS sensor for C-reactive protein detection based on nanomechanics," IEEE Trans Biomed Eng. 2009, 56(2): 462-70, doi: 10.1109/TBME.2008.2003262, the entire contents of each of which are incorporated by reference herein.

In certain embodiments, sensor 102 measures information about oxygenation of the user's blood in the user's oral cavity. The information can include, for example, information about the user's blood oxygen saturation. A number of different blood oxygen saturation measurements can be performed by sensor 102. In some embodiments, sensor 102 obtains measurements of arterial oxygen saturation for the user from within the oral cavity. In certain embodiments, sensor 102 obtains measurements of oxygen saturation of the user's brain tissue from within the oral cavity. Examples of suitable sensors are described in Bingger et al., "In vivo monitoring of blood oxygenation using an implantable MEMS-based sensor," 2010 IEEE 23rd International Conference on Micro Electro Mechanical Systems (MEMS), Wanchai, Hong Kong, 2010, pp. 1031-1034, doi: 10.1109/MEMSYS.2010.5442385, the entire contents of which are incorporated by reference herein.

In some embodiments, sensor 102 measures information about concentrations of one or more ions within the user's oral cavity. Device 100 can, in certain embodiments, include multiple sensors each dedicated to measurements of one type of ion. Alternatively, or in addition, device 100 can include at least one sensor that performs measurements of multiple different ion concentrations. Examples of ions that can be measured by sensor 102 include, but are not limited to, sodium ions and/or potassium ions. Various types of sensors can be used for measuring ion concentrations. Examples of suitable sensors are described in Wu et al., "A Microfluidic Ion Sensor Array," Small 16(6): 1906436 (2020), Karthikeyan et al., "Fluorometric Sensor for Mercury Ion Detection in a Fluidic MEMS Device," IEEE Sensors Journal, vol. 18, no. 13, pp. 5225-5231, 1 Jul., 2018, doi: 10.1109/JSEN.2018.2840331, the entire contents of each of which are incorporated by reference herein.

In some embodiments, sensor 102 measures electrical signals the user's oral cavity. More specifically, for example, sensor 102 measures electrical impulse information (e.g., an electro-cardiogram sensor). Depending upon the nature of the electrical impulse information that is measured, the information can correspond to contractions of one or more of the user's muscles, and in particular, the user's heart muscle(s). Examples of sensors that can be used to measure electrical impulse information are described in Kim et al., "Miniature electrocardiography sensor using a flexible printed circuit and MEMS technology," 2008 IEEE International Conference on Multisensor Fusion and Integration for Intelligent Systems, Seoul, 2008, pp. 545-550, doi: 10.1109/MFI.2008.4648052, the entire contents of which are incorporated herein by reference.

In certain embodiments, sensor 102 is an acoustic detector that measures acoustic information from within the user's oral cavity. For example, sensor 102 can be configured to detect information about blood flow in the user's oral cavity through acoustic measurements. Examples of sensors that can be used to measure acoustic information in device 100 are described in Hegde et al., "Piezoelectric acoustic MEMS sensor based electrical machines condition monitoring-diaphragm design analysis," 2013 International conference on Circuits, Controls and Communications (CCUBE), Bengaluru, 2013, pp. 1-7, doi: 10.1109/CCUBE.2013.6718553, and Ali et al., "Piezoelectric MEMS based acoustic sensors: A review," Sensors and Actuators A: Physical 301: 111756 (2020), the entire contents of each of which are incorporated herein by reference.

Referring to FIG. 1, device 100 includes a signal transmitter 112 that is positioned on (i.e., connected to) a surface of housing 124. Alternatively, in some embodiments, signal transmitter 112 can be positioned within a wall of housing 124. As shown in FIG. 2, where housing 124 has the form factor of a mouthguard, in some embodiments signal transmitter 112 can be positioned within a portion of housing 124 that connects to an external device such as helmet or facemask, which facilitates retention of the mouthguard during the user's physical activity. Thus, for example, housing 124 includes a first arched portion defined by walls 126 and 128, and a second portion (i.e., signal transmitter 112) that extends outward from the first portion.

In general, signal transmitter 112 transmits information derived from measurement signals generated by the sensors of device 100. For example, device 100 can include an interface as part of controller 114 that is connected to the sensors and to signal transmitter 112. The interface receives measurement signals and information from the sensors, and transmits information via signal transmitter 112. During operation of device 100, measurement signals are received by the interface from the sensors and communicated to one or more electronic processors of controller 114. The one or more processors can optionally analyze the measurement signals to extract and/or generate information to be transmitted. The information is then delivered to signal transmitter 112 through the interface, and transmitted by signal transmitter 112 (e.g., to another device remote from device 100).

In some embodiments, one of the sensors 102, 104, 106, and 108 can be a temperature sensor that measures temperature information for the user's oral cavity. Suitable temperature sensors are widely available commercially, and include for example platinum RTD temperature sensors available from IST (Las Vegas, NV).

In certain embodiments, one or more of sensors 102, 104, 106, and 108 can be positioned within the walls of housing 124 such that they are adjacent to the user's teeth when housing 124 is worn. For example, one or more of the sensors can be positioned on or adjacent to an outer surface of wall 126 in FIG. 2 (i.e., the surface that defines a portion of channel 130). One or more of the sensors can be positioned on or adjacent to an inner surface of wall 128 in FIG. 2 (i.e., the surface that defines a portion of channel 130).

Device 100 can generally include one or more electronic processors (e.g., as part of controller 114). The electronic processor(s) can be mounted on control board(s) 116 and/or 118, for example, or be positioned in another portion of the device, e.g., on or within a portion of housing 124. As described above, an electronic processor of the device can be connected to each of the device's sensors through an interface. The processor receives measurement signals generated by the sensors, and delivers information to signal transmitter 112 for transmission to one or more external devices.

In some embodiments, the electronic processor receives at least one measurement signal from the sensors that includes information about the position of device 100, and generates—based on the measurement signal(s)—a data signal that includes information about the position of device 100 for transmission by signal transmitter 112. The data signal can include, for example, any one or more of the various types of position-related information described above.

In certain embodiments, the electronic processor receives at least one measurement signal from the sensors that includes information about a biochemical and/or electrical and/or acoustic property of the user's oral cavity, and generates—based on the measurement signal(s)—a corresponding data signal for transmission by signal transmitter 112. The data signal can include, for example, any one or more of the various types of biochemical, electrical, and acoustic information described above.

Controller 114 and the electronic processor(s) thereof can be configured to adjust both the rate at which certain types of information are measured by the sensors of device 100, and the rate at which certain types of information are transmitted via signal transmitter 112 to one or more external receiving devices. Measurement and transmission of information can be regulated for various reasons, including power management for device 100. Specifically, in some embodiments, power source 110 is a battery with limited power storage capacity before replenishment (e.g., replacement or re-charging) of the stored power is needed. By suitable management of power consumption by device 100, the duration of operation of the device between battery replacement or re-charging operations can be extended.

In some embodiments, for example, an electronic processor of controller 114 receives a first measurement signal from sensor 102 and a second measurement signal from sensor 104, and generates corresponding data signals from the measurement signals. However, the data signals are generated at different frequencies for transmission by signal transmitter 112. For example, a first data signal (corresponding to a first measurement signal) can be generated at a first frequency, while a second data signal (corresponding to a second measurement signal) can be generated at a second, different frequency.

For certain types of measured information, the first frequency can be higher than the second frequency, so that information of one type is transmitted at a higher frequency (e.g., a larger number of measurements per unit time) than information of another type. As an example, in some embodiments, information corresponding to one or more biochemical, electrical, and/or acoustic properties of the user's oral cavity can be transmitted at a higher frequency than information corresponding to a position of device 100. Alternatively, in certain embodiments, information corresponding to a position of device 100 can be transmitted at a higher frequency than information corresponding to one or more biochemical, electrical, and/or acoustic properties of the user's oral cavity.

During operation, data can be transmitted (and measured) at a variety of different frequencies to conserve power and prioritize certain types of information, as described above. For example, data can be transmitted at frequencies of 0.000001 Hz or more (e.g., 0.000005 Hz or more, 0.00001 Hz or more, 0.00005 Hz or more, 0.0001 Hz or more, 0.0005 Hz or more, 0.001 Hz or more, 0.005 Hz or more, 0.01 Hz or more, 0.05 Hz or more, 0.1 Hz or more, 0.5 Hz or more, 0.7 Hz or more, 0.8 Hz or more, 1.0 Hz or more, 3.0 Hz or more, 5.0 Hz or more, 10 Hz or more, 20 Hz or more, 30 Hz or more, 50 Hz or more, or even more). Data transmitted and/or measured at relatively higher and/or lower frequencies can be transmitted and/or measured at a range of frequencies between any of the above enumerated frequencies. Data transmitted and/or measured at relatively higher and/or lower frequencies can alternatively be transmitted and/or measured at frequencies of $1 \times 10^{-7}$ Hz or less (e.g., $1 \times 10^{-8}$ Hz or less, $1 \times 10^{-9}$ Hz or less, or even less).

As another example, in certain embodiments where the sensors of device 100 measure two or more different types of information corresponding to biochemical, electrical, and/or acoustic properties of the user's oral cavity, the different types of information can be transmitted at the same or different frequencies. Similarly, in some embodiments where the sensors of device 100 measure two or more different types of information corresponding to the position of device 100, the different types of information can be transmitted at the same or different frequencies. More generally, for n different types of information measured by the sensors of device 100, the electronic processor can generate data signals at any number 1 to n of different frequencies.

These relative data transmission rates can be selected to reflect not only power management considerations, but also physiological considerations. For example, the information measured by the sensors of device 100 can reflect physiological changes and conditions of the user, but not all changes and conditions manifest at the same rate or time. Thus, for example, changes in pH in the oral cavity typically occur relatively slowly, and therefore pH-related information can be transmitted at relatively low frequencies, with little chance that important physiological information will be lost or overlooked. In contrast, acceleration-related information can be valuable for assessing a user's possible head trauma, and it is therefore advantageous to transmit this information at a higher frequency to ensure that trauma-related events are not overlooked. In general, the relative rates of data signal transmission can be selected based on the types of conditions for which the measured information functions as an indicator or diagnostic, and the types of responses to those conditions that are typically undertaken.

For certain types of measurement signals, the corresponding data signals can be transmitted effectively at a frequency of zero—that is, the corresponding data signals can be stored in a storage unit of device 100, and transmitted to an external device at a later time. As one example, measurement signals corresponding to the position of device 100 (i.e., position tracking signals) can be stored for offline analysis when device 100 is not in operation.

In some embodiments, the electronic processor is configured to activate the various sensors of device 100 to measure information within the user's oral cavity. Thus, the electronic processor can regulate the frequency with which each sensor measures information and transmits a corresponding measurement signal to controller 114. The electronic processor can selectively activate the sensors at different frequencies so that different types of information are measured and transmitted at different frequencies to controller 114.

The selection of suitable activation and/or measurement frequencies for each of the sensors of device 100 can occur according to criteria as described above. Specifically, the frequencies of measurement can be adjusted by the electronic processor to manage the power consumption of device 100, and also so that physiological information is measured at frequencies that are suitable to ensure that important diagnostic information is not lost or overlooked. The relative measurement frequencies selected by the electronic processor can be similar to those described above in connection with data signal transmission frequencies, for example.

In certain embodiments, one or more measurement signals and/or data signals can be generated by device 100 in real-time. For purposes of this disclosure, "real-time" refers to a measurement or transmission frequency of 1 Hz or more. Important physiological and/or positional information can be transmitted in real-time to facilitate rapid diagnosis and ameliorative action in response to conditions that are represented by the physiological and/or positional information. Such conditions can include, for example, sudden head trauma, shock, sepsis, and seizures.

As discussed above, controller 114 can regulate activation and power delivery to the sensors of device 100 to manage power consumption and extend the operating window of the device, before charging of device 100 (or battery replacement) is performed. Power delivery to any one or more of the sensors can be controlled, for example, by activating the one or more sensors at particular times, and for particular measurement intervals. As discussed above, for example, sensors can be activated (and measurements performed) at selected frequencies; reducing the measurement frequency for a particular sensor conserves power, at the expense of reducing the rate at which a corresponding measurement is performed.

As further discussed above, the frequency with which certain measurements are performed and measurement information transmitted can depend on the nature of the measurements and their status as possible reporters of significant physiological trauma. Thus, for example, measurement information that more strongly correlates with, or is diagnostic of, certain acute conditions may be measured at comparatively higher frequencies by device 100, so that immediate interventional assistance can be provided to the user.

When device 100 is worn by a user that is at risk for exposure to repeated traumatic events (such as head trauma arising from multiple physical impacts during participation in a contact sport), the cumulative effect of such events may place the user at enhanced risk for acute injury. The user's enhanced risk can be qualitatively assessed based on a number of factors. Among these is the number of impacts of sufficient force (e.g., as measured by change in acceleration, change in velocity, change in angular velocity, change in angular acceleration) cumulatively experienced by the user. As the number of such impacts increases, the user's risk of acute injury increases.

Accordingly, in some embodiments, controller 114 measures a cumulative impact count for the user, and delivers power to the sensors of device 100 based, at least in part, on the impact count. As the user's impact count rises, for example, controller 114 can increase the frequency with which certain measurements are performed by adjusting the frequency at which certain sensors are activated to perform the measurements. Individual impacts can be detected, for example, by measuring changes in linear or angular acceleration, velocity, and/or position that are larger (in magnitude) by appropriate threshold values, within a selected (relatively short) time window. When such an impact is detected, the impact count is augmented and controller 114 determines whether frequencies at which any of the measurements are performed should be increased.

Data signals generated by device 100 are transmitted by signal transmitter 112 for receipt by one or more external devices at one or more external locations, where the signals can be analyzed and/or reported. Interventional action can also be initiated, depending upon the nature of the transmitted data. A wide variety of different applications of the transmitted data streams are possible.

In some embodiments, for example, data signals generated by device 100 can be transmitted to medical staff on the sidelines or in a sporting facility where the user of device 100 is engaged in a physical activity. The medical staff can determine, based on the transmitted signals, whether it is appropriate to prevent the user from continuing to participate in the activity. For example, the transmitted data may indicate that the user has suffered one-time head trauma of sufficient severity that his/her participation should be discontinued. Alternatively, or in addition, the transmitted data may indicate that the user has suffered cumulative head trauma of sufficient duration and extent that participation should not continue.

In some embodiments, data signals generated by device 100 can be transmitted to an external computing facility, where they can be analyzed according to specialized algorithms that take into account one or more different types of information and determine information about the pathophysiologic status of the user. This information can be used to update a user's medical records, for example, or to generate further information for transmission to the user's physician or to other medical personnel for interventional action.

In certain embodiments, data signals generated by device 100 can be transmitted to a hospital, e.g., to the emergency receiving unit, so that the hospital is prepared to receive the user in the event that the user's condition is severely compromised. The data signals can be transmitted to operating room personnel so that emergency surgical intervention can be arranged in advance of the user's arrival at the hospital facility, and appropriate supplies (e.g., blood units, fluids) can be obtained.

In certain embodiments, data signals generated by device 100 can be transmitted to persons involved in emergency and/or rescue operations, such as emergency medical technicians. The data transmitted can be used by such persons in the provision of immediate care and to facilitate rapid decisions regarding interventional treatment actions.

In some embodiments, data signals generated by device 100 can be transmitted to non-medical personnel. For example, the data can be transmitted to parents and other relatives of the user, particularly during engagement of the user in a physical activity (e.g., a sport), so that parents and relatives can monitor the user's condition, and intervene to discontinue the user's participation under certain circumstances. In addition, the data can be transmitted to coaches, game officials, and other individuals involved in the administration of sporting events and other physical activities so that the individuals can monitor the user's condition and intervene if necessary.

The information measured by the sensors of device 100 and contained in the data signal transmitted by the device can be representative of (or even diagnostic of) a wide range of different conditions. For example, sudden acceleration (including deceleration) of the user's head can be indicative of head trauma such as a collision, which may lead to a concussion and/or other traumatic physical injury. Such collisions can create strong shear forces in the user's brain, leading to cerebral edemas and other shear force-related injuries. Data signals corresponding to sudden acceleration of the user's head can be transmitted in real-time for immediate intervention.

Changes in measured electrical signals (e.g., corresponding to the user's heart muscle contractions) can be representative of microfibrillations, which may precede seizures, heart attacks, strokes, and other serious trauma. Data signals corresponding to measured electrical signals can be transmitted in real-time for immediate action to ensure that such traumas are prevented or rapidly treated.

Changes in blood and/or tissue oxygenation (e.g., arterial oxygen saturation, brain tissue oxygenation) can occur when a user suffers a traumatic physical injury. For example, for a soldier in the field who suffers a serious injury, changes in the soldier's blood and/or tissue oxygenation can occur, and data signals that include such measurements can be transmitted to a field office monitoring the soldier's condition remotely. The field office can dispatch assistance to the soldier, even if the soldier is incapable of reporting his/her injury. Data signals that include position tracking information can be used to locate the injured soldier. Moreover, certain types of information may indicate physiological conditions such as pre-seizure in the soldier, so that appropriate on-site intervention can occur immediately.

Rapid rotational motion of the user's head can lead to spinal cord and brain injury. Data signals that include information about measured rotational motion can be used to provide diagnostic information useful for assessing the cumulative effect of such motions, and the user's potential susceptibility to spinal cord injury. Such information can be used for immediate intervention, e.g., to discontinue participation by the user in a physical activity, and also for longer-term treatment of cumulative physical injuries.

Although device 100 is implemented in FIGS. 1 and 2 as a mouthguard, the device can also be implemented in other forms as well. For example, when a patient is intubated during surgery, a bite block can be inserted to prevent the patient from biting the intratracheal tube that is inserted. Device 100 can be incorporated into the bite block, and can function as described above to measure information and transmit data signals that are useful for diagnostic and interventional purposes in the operating room, and in post-operative patient care.

OTHER EMBODIMENTS

While this disclosure describes specific implementations, these should not be construed as limitations on the scope of the disclosure, but rather as descriptions of features in certain embodiments. Features that are described in the context of separate embodiments can also generally be implemented in combination in a single embodiment. Conversely, various features that are described in the context of a single embodiment can also be implemented in multiple embodiments separately or in any suitable sub-combination. Moreover, although features may be described above as present in certain combinations and even initially claimed as such, one or more features from a claimed combination can generally be excised from the combination, and the claimed combination may be directed to a sub-combination or variation of a sub-combination.

In addition to the embodiments expressly disclosed herein, it will be understood that various modifications to the embodiments described may be made without departing from the spirit and scope of the disclosure. Accordingly, other embodiments are within the scope of the following claims.

What is claimed is:

1. A measurement device, comprising:
   a housing comprising a channel, wherein the housing is dimensioned to be worn in an oral cavity of a user and the channel is positioned such that at least some of the user's teeth or gums are positioned in the channel when the housing is worn;
   first and second sensors each positioned within or on a surface of the housing, and each configured to measure a value associated with a position of the measurement device, a biochemical property of the user's oral cavity, and an electrical property of the user's oral cavity, at respective first and second frequencies;
   a power source connected to the first and second sensors; and
   an electronic processor connected to the first and second sensors and to the power source,
   wherein the electronic processor is configured so that during operation of the measurement device, the electronic processor regulates power delivery from the power source to the first and second sensors based on the first and second frequencies and an impact count associated with the user.

2. The device of claim 1, wherein the electronic processor is configured to determine when an impact has occurred based on the values measured by the first and second sensors.

3. The device of claim 2, wherein the electronic processor is configured to adjust the impact count after determining that an impact has occurred.

4. The device of claim 1, wherein the electronic processor is configured to increase a rate of power delivery to at least one of the first and second sensors following an increase in the impact count.

5. The device of claim 4, wherein the electronic processor is configured to adjust at least one of the first and second frequencies following the increase in the impact count.

6. The device of claim 5, wherein the electronic processor is configured to increase at least one of the first and second frequencies following the increase in the impact count.

7. The device of claim 4, further comprising a transmitter connected to the electronic processor and to the power source, wherein the electronic processor is configured to transmit the values measured by the first sensor at a third frequency to a receiver, and to transmit the values measured by the second sensor at a fourth frequency to the receiver.

8. The device of claim 7, wherein the electronic processor is configured to increase a rate of power delivery to the transmitter following the increase in the impact count.

9. The device of claim 8, wherein the electronic processor is configured to increase at least one of the third and fourth frequencies following the increase in the impact count.

10. The device of claim 9, wherein the values measured by the first sensor comprise at least one of information about a spatial coordinate position of the measurement device and information about a change in a spatial coordinate position of the measurement device.

11. The device of claim 9, wherein the values measured by the first sensor comprise at least one of information about a change in a rotational orientation of the measurement device, information about a linear acceleration of the measurement device, and information about a rotational acceleration of the measurement device.

12. The device of claim 9, wherein the values measured by the first sensor comprise information about at least one of a hydrogen ion concentration in saliva in the user's oral cavity, a glucose concentration in saliva in the user's oral cavity, information about a concentration of a nucleic acid species in the user's oral cavity, information about a concentration of an amino acid species in the user's oral cavity, information about blood oxygen saturation in the user's oral cavity, and information about a concentration of ions in saliva in the user's oral cavity.

13. The device of claim 9, wherein the values measured by the first sensor comprise electrical impulse information in the user's oral cavity corresponding to the user's heart muscle contractions.

14. The device of claim 9, wherein the values measured by the first sensor comprise acoustic information in the user's oral cavity corresponding to blood flow in the user's oral cavity.

15. The device of claim 5, wherein the electronic processor is configured to increase the rate of power delivery to the first sensor and decrease the rate of power delivery to the second sensor.

16. The device of claim 15, wherein the electronic processor is configured to increase the first frequency and decrease the second frequency.

17. The device of claim 16, wherein the electronic processor is configured to discontinue measurement of values by the second sensor.

18. The device of claim 5, further comprising a third sensor positioned within or on the surface of the housing and connected to the electronic processor and to the power source, and configured to measure a value associated with a position of the measurement device, a biochemical property of the user's oral cavity, and an electrical property of the user's oral cavity, at a fifth frequency.

19. The device of claim 18, wherein the electronic processor is configured to initiate power delivery to the third sensor to activate the third sensor and measure the values using the third sensor.

20. The device of claim 19, wherein the electronic processor is configured to increase power delivery to the third sensor following the increase in the impact count.

21. The device of claim 19, wherein the electronic processor is configured to increase the fifth frequency following the increase in the impact count.

22. The device of claim 19, further comprising a transmitter connected to the electronic processor and to the power source, wherein the electronic processor is configured to transmit the values measured by the third sensor at a sixth frequency to a receiver.

23. The device of claim 22, wherein the electronic processor is configured to increase the sixth frequency following the increase in the impact count.

* * * * *